(No Model.)
H. L. WEBB.
SIGNALING DEVICE.
No. 566,951.              Patented Sept. 1, 1896.
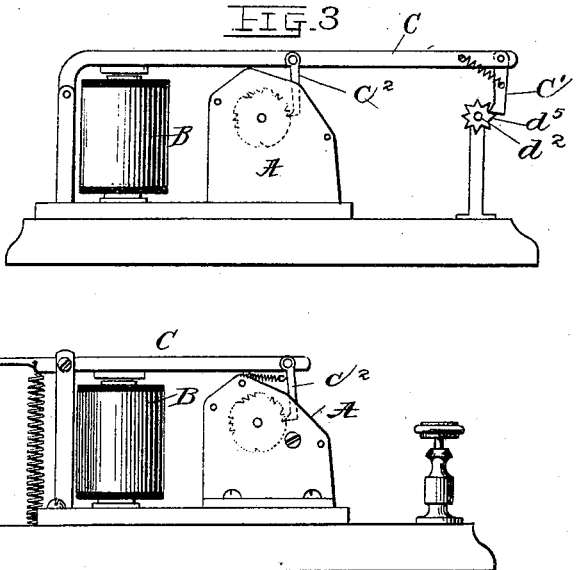
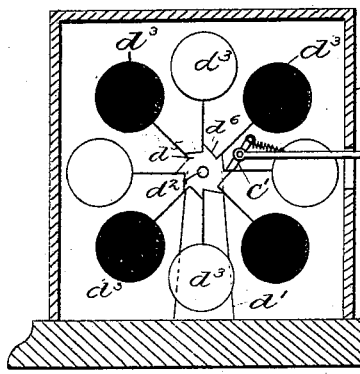
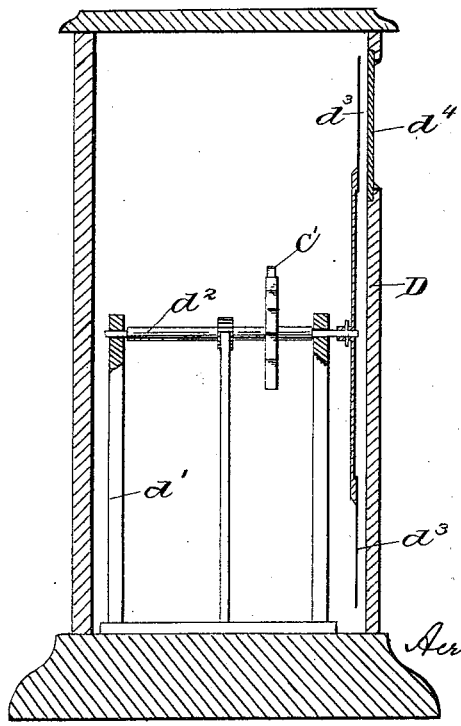
WITNESSES:
Edward C. Rowland.
F. P. Vorhees
INVENTOR
Herbert Laws Webb
BY
Price & Stewart
ATTORNEYS

UNITED STATES PATENT OFFICE.

HERBERT LAWS WEBB, OF NEW YORK, N. Y., ASSIGNOR TO THE ELECTRIC SELECTOR AND SIGNAL COMPANY, OF WEST VIRGINIA.

SIGNALING DEVICE.

SPECIFICATION forming part of Letters Patent No. 566,951, dated September 1, 1896.

Application filed March 18, 1893. Serial No. 467,389. (No model.)

*To all whom it may concern:*

Be it known that I, HERBERT LAWS WEBB, a citizen of Great Britain, residing in the city of New York and State of New York, have invented a new and useful Improvement in Signaling Devices and their Connection with Selecting Instruments, of which the following is a specification.

The objects and uses of my invention are primarily in connection with telegraphs and telephones to indicate to the different stations on the line when the same is occupied by the transmission of a message or conversation, but the device may be applied to other and different uses.

The following is a full description of the invention, illustrated by the accompanying drawings, of which—

Figure 1 illustrates an upright side view of a selecting instrument and signaling device operated by a single magnet; Fig. 2, an end view of the signaling device and its appliances. Fig. 3 illustrates the operation of a signaling device and a selecting instrument by mechanism placed on the same side of the fulcrum of the armature-lever.

Viewing Fig. 1, A represents a selecting instrument of the class which are operated by an electromagnet, as B, actuating an armature-lever, as C. Such a selecting instrument is adapted to respond to a predetermined arrangement or a fixed combination of electrical impulses from a transmitting instrument through the coils of its electromagnet, and as such instruments are well known it need not be further described.

Within a suitable frame, as D, the signaling device is placed, and consists of a suitable standard, as $d'$, supporting in bearings a shaft $d^2$. Upon this shaft and arranged to revolve therewith are a series of disks $d^3$ of alternating colors, as white and red or white and black, as shown. These disks are inclosed within the box D, which is provided with a glass window $d^4$ in line with the revolving disks, so as to show but one of them at a time. On the shaft $d^2$ is placed the wheel $d^5$, provided with the teeth $d^6$, and the armature-lever C is furnished at that end with the pawl $c'$. At each downward movement of this end of the lever C the wheel $d^5$ is moved one tooth, which alternately brings the disks $d^3$ in front of the window $d^4$. At the other end of the armature-lever is the pawl $c^2$, which operates responsively to the impulses to work out the combination on the wheel of the selecting instrument. Now it will be seen that if the wheels of any number of selecting instruments are all arranged with combinations containing an odd number of impulses, as the device is illustrated in the drawings, the end of any such combination of impulses will show a colored signal at the window and indicate that the line is in use. Of course the devices may be arranged for combinations of even numbers just as well, or the white disks may be arranged to indicate that the line is occupied. It will also be seen that when the magnet has drawn down the armature-lever it operates the selecting instrument, and when released by the magnet the other end is drawn down by the spring E, and this movement operates the signal. Thus both devices are operated by the armature-lever of a single magnet. Of course the device could be arranged to operate the signals by attachments to the same side of the armature-lever as those which operate the sector or wheel of the selecting instrument, and to operate it by a movement in the same direction, if desired, as illustrated in Fig. 3.

When the signaling device is placed on a line with a number of selecting instruments, it will be seen that in operating any one of the series to the end of its course the signaling device will indicate to all the stations that the line is in use.

What I claim, and desire to secure by Letters Patent, is—

1. The combination with an electrical-impulse-transmitting instrument and a selecting instrument adapted to respond to electrical impulses from said transmitter, of a signaling device in connection therewith, adapted to be moved step by step and thereby display successive signals alternating in sign at each step, an electromagnet responding to the impulses and provided with an armature-lever and its retractile spring, means for actuating the selector operated by said lever when approaching the pole of its magnet, and means for actuating the signal device operated by said lever when retracted by its spring.

2. The combination with an electric-impulse-transmitting instrument and a selecting instrument adapted to respond to electrical impulses from said transmitter of a signaling device in connection therewith adapted to be moved step by step and thereby display successive signals alternating in sign at each step, an electromagnet for actuating both, responding to the impulses and provided with an armature-lever and its retractile spring, mechanism attached to one end of said lever to thereby actuate the selector upon one of its movements, and means attached to the other end of said lever to thereby actuate the signal device upon its reverse movement.

Signed at the city of New York, in the county of New York and State of New York, this 25th day of February, A. D. 1893.

HERBERT LAWS WEBB.

Witnesses:
   F. P. VOORHEES,
   FRANCIS B. ANTZ.